United States Patent Office 3,684,701
Patented Aug. 15, 1972

3,684,701
ADDUCTING SLURRY PROMOTERS
Everett J. Fuller, 666 Long Hill Road,
Gillette, N.J. 07933
No Drawing. Filed Mar. 2, 1970, Ser. No. 15,923
Int. Cl. C07b 21/00
U.S. Cl. 208—308
17 Claims

ABSTRACT OF THE DISCLOSURE

A separation process, which utilizes inclusion compounds, e.g. insoluble complexes which form between a suitable compound (host) and at least one constituent of a feed mixture (guest) has been practiced in the presence of a solvent, such solvent having partial solvency for both host and guest and also permitting the formation, after complexing, of separated liquid layers, i.e., one containing primarily feed liquor depleted in guest, the other layer containing the solvent and a complex of host and guest slurry therein. This system is, however, limited in certain cases with regard to equilibrium. That is to say, once a given amount of guest has been complexed with the host equilibrium limitations prevent any additional complex from forming. The equilibrium problem is solved by adding to the system a compound which forms a complex with the host and dissolves preferentially in solvent, so that such compound will remain with the solvent and eliminate or reduce the requirement that it be removed from depleted feed in a separate operation.

FIELD OF THE INVENTION

This invention relates to a process for the separation of constituents within a feed mixture. More particularly, this invention relates to a process for the separation of constituents within a feed mixture by the formation of an insoluble inclusion compound between a host compound or complexing agent such as thiourea or urea and at least one constituent of the feed mixture, referred to as the guest.

An earlier application, U.S. Ser. No. 741,607, filed July 1, 1968, now Pat. No. 3,537,983 disclosed a process in which a substantially inert, substantially anhydrous solvent is added to a processing sequence wherein such inclusion compounds are formed. The solvent utilized in this process is such that after complexation the solvent encourages the formation of two separate liquid layers, a top layer containing the feed liquor depleted in guest and the other, or bottom layer, a slurry containing the insoluble complex of host and guest within a solvent. Contacting between the feedstream and the solvent including the host is countercurrent so that the process is continuous in its nature.

The instant invention is to be utilized in those instances wherein the ability of the guest to complex with the host is limited by equilibrium, particularly in a process wherein the detailed crystal structure of the host-guest adduct is different from that of the host solid, so that an equilibrium is set up between host, guest and adduct. The adduct structure is maintained by equilibration with unadducted guest. Where a single guest is present, there must be a certain limiting activity of unadducted guest, regardless of the excess of host. Thus, adduct formation will reduce the guest activity to this limit but not to zero. If the limit corresponds to pure guest, the equilibrium constant is said to be unity, and no separation is normally possible. Equilibrium constants greater than unity are used to describe adducts which are unstable and again, no separation is normally possible.

The above-mentioned equilibrium limitation presents a significant problem because many separations have limits high enough to make processing unattractive. For example, thiourea will remove cyclohexane as adduct from a solution until a limit of about 2% by wt. is reached; but the common cyclohexane-containing mixtures generally contain less than 2% cyclohexane.

PRIOR ART

The use of inclusion compound-forming substances such as urea, thiourea or the various clathrating agents in order to preferentially complex guest molecules is well known in the art. One may find an extensive treatment of this subject in Mandelcorn, "Non-stoichiometric Compounds," Academic Press, 1964, herein incorporated by reference.

Briefly, an inclusion compound has two elements, a host and a guest. Data obtained from X-ray studies reveals that the complexes are formed when a guest compound is trapped either in channels, as is the case with urea and thiourea, or in cages, which is the case when one makes use of a clathrating agent as a host compound. These channels or cages are formed by the continuous crystal lattice of the host compound; such compounds do not obey the law of simple multiple proportions, the molecular ratio of host to guest is not necessarily a whole number. Thus, the stability of the complex or adduct depends upon a physical relationship or fit, between the guest molecules and the channels or cages. There need be no specific reaction between the guest molecule and the host. The stability of the various complexes or adducts will vary directly with how close a fit is obtained between the guest and the host cavity.

The various uses for these adducts have been well documented in the literature. Urea is the most commonly used and will form a complex with normal paraffins. Other host molecules are well known, for instance, thiourea which will form a complex with highly branched chain paraffins. Other well known host compounds are: 2-methylnaphthalene, choleic acids, 4,4′-dinitrophenol and the cyclo tri-phosphazine derivatives. Additionally, the clathrating agents such as hydroquinone, certain metal-ion Werner complexes, even ordinary water, as in methane hydrate, behave in asimilar fashion.

It is known that dry urea will slowly separate elements from a hydrocarbon mixture. It was proposed in the past to accelerate the separation by activating dry urea with promoters such as polar compounds as typified by water or methanol. These processes present serious disadvantages since urea tends to hydrolyze in the presense of water. Additionally difficulties were encountered when one attempted to separate the adduct from the feedstream which was depleted in guest compound. The adduct was difficult to filter because of large pressure drops across the filter cake.

Technically, the commercial adduction processes treated the adduct as a filterable solid in a batch-type operation. These batch operations severely limited commercial development of the inclusion type separation process since the batch operations are generally poorly adapted to large scale operation, are expensive and require careful control of particle size.

Attempts have been made to introduce a continuous process into the inclusion field. Typical of these is U.S. Pat. 2,632,002 wherein added solids such as silica gel are used to entrain the adduct in a slurry and also encourage additional adduct formation. Nevertheless, this process requires the use of water or similar solvents which create difficulty in the separation of the adduct from the adsorbent.

More recently, a process was disclosed in Ser. No. 741,607 which was continuous in nature but eliminated the reactive solvents and adsorbent additives of the previous invention. In this process a substantially anhydrous inert solvent was added to the process scheme. The nature of this solvent is such that, with the feed stock and the complexing agent, it generates two liquid phases at equilibrium. The top liquid phase or layer contains primarily feedstream depleted in guest, the other or bottom layer, a slurry, comprising the solvent with a complex of host and guest slurried therein. Adduct is continually precipitated into this layer.

A problem associated with such a process is that it may be equilibrium limited. That is to say, when one achieves a certain degree of complexation between host and guest, it is virtually impossible for more complex to form, since the activity of guest in the depleted feed mixture is at its limit. For example, removal of 2,2-dimethylbutane from a hexane isomerate down to about 10 to 14% by thiourea slurry is immediate. Regardless of the slurry excess used, however, as long as only hexanes, thiourea, and non-adducting solvent are in the system, a depleted feed stream of less than 10% by weight may not be obtained.

It has been known in the past that if an additional guest compound is added, the equilibrium limitation is no longer present. Essentially, the additional guest stabilizes the adduct structure, so that adduct will be made at all concentrations of desired guest. The additional guest must form adduct with the same crystal structure as the desired guest, or a new solid adduct phase results which cannot contain desired guest, and no advantage is realized. The adding of an additional guest is described in British Pat. 718,703; it is emphasized that the present invention pertains to a separations process involving countercurrent, continuous, staged contacting of a feed mixture with a slurry of solid contacting agent in a solution substantially immiscible with the feed stream of depleted feed stream. According to the present invention, the slurry promoting substance is kept with the slurry because it preferentially dissolves in the slurry solvent rather than in the total feed mixture or the depleted feed mixture. Its removal from the depleted feed is thus made wholly or partly automatic.

Also within the scope of the present invention is the improvement whereby the slurry promoter is displaced wholly or partly from slurry by desired guest, once the concentration of desired guest has reached or passed its equilibrium limit. Displacement may occur by (1) extraction of the slurry promoter from solution in the slurry by feed mixture, recycle streams, or a combination of these; or (2) displacement in the solid adduct, taking advantage of fundamental differences in adduct stability between adduct of slurry promoter and adduct of desired guest.

Virtually complete internal recycle of slurry promoter within a multistage contacting unit is made practicable by a combination of its adduct-forming and solubility properties.

SUMMARY OF THE INVENTION

In accordance with this invention a method has been devised wherein the equilibrium limitations previously encountered while adducting various guest compounds with a host compound are altered so that substantially all of the host compound can be adducted with the guest compound. This change in equilibrium is effected by adding to the system a slurry promoter which has the following characteristics:

(1) it dissolves preferentially in the solvent rather than the feed mixture, and
(2) it is capable of forming a complex with the host compound.

It is most unexpected that a substance which is polar enough to preferentially dissolve in the solvent would at the same time be sufficiently non-polar so as to form the adduct.

Thus in a specific embodiment, a feed stream composed of hexane isomers would be countercurrently contacted with thiourea, a host compound which is slurried within a solvent, i.e. propylene carbonate. The thiourea serves to remove the highly branched paraffin compounds from the feed stream but is only able to do this until about 10 to 15 wt. percent of adduct-forming guest remains. At this point, the above mentioned equilibrium limitation sets in and it is substantially impossible to remove any more doubly branched paraffins with thiourea.

By the process of the instant invention, a slurry promoter, such as tetrahydrofuran is added to the system. The promoter, which is able to form a complex with the thiourea ensures the presence of thiourea as adduct even when the concentration of dimethylbutanes in the depleted feed stream approaches zero and at this point substanially all of the iso paraffins may be complexed with the thiourea present.

Two separate layers are formed, one layer comprises feedstream, depleted in isoparaffins, with some dissolved tetrahydrofuran; the other slurry of solvent and adduction compounds formed between thiourea and dimethylbutanes as well as thiourea and tetrahydrofuran. The tetrahydrofuran must preferentially dissolve in the solvent because it is maintained in intimate contact with the thiourea throughout the process and costly processing to remove the major portion of it from the depleted feed stream is not necessary.

More generally, the instant invention pertains to a means for continuously treating liquid mixtures containing substances which are retained to varying degrees by a solid host structure. These substances, or guests, may or may not stabilize the said host structure when present in high concentration; the essential requirement for the process being that the components of the feed stream differ in their tendencies to be retained by the said host structure. Thus, the separation of mixtures of substances none of which form stable complexes with the host may be accomplished by this process.

In particular, highly branched paraffins which have value as a motor fuel may be separated by the process of the instant invention especially, $C_8$ to $C_9$ highly branched paraffins which are especially high octane components of motor fuels. Typically, the aliphatic compounds to be removed by the instant invention are found in hydrocabron streams boiling between 50 and 500° F. Specifically, these feed streams would include naphthas from any source, such as virgin, cracked, hydrocracked, or catalytically cracked. A typical naphtha feed stream would boil between 70 and 350° F.; such a stream would contain normal paraffins, isoparaffins, naphthenes, aromatics, and olefins. Other feed streams which may be treated by the instant invention include kerosenes boiling between 300 and 800° F. and lube oil fractions boiling between 400 and 1200° F. It is desirable to remove normal paraffins from these feed streams because the normal paraffins tend to solidify at low temperatures and plug fuel oil lines or jet fuel injection systems. In lube oils, solids accumulation due to normal paraffins generally render the product unusable.

Where urea is used as the complexing host in a process to remove normal or slightly branched paraffins, the slurry promoter to be added must, of course, form a stable inclusion compound with urea. An example of a desirable slurry promoter in this case is tetraethylene glycol.

For purposes of this invention, the preferred embodiment is the removal of high octane components from a naphtha feed stream, or an effluent from an isomerization reactor. Such components include the more highly branched linear paraffins in the $C_6$ to $C_9$ range, methylcyclopentane, cyclohexane, and isopentane (2-methylbutane). It is well known in the art that iso-pentane forms no stable inclusion compound with thiourea, yet it may be separated from normal pentane by the process of this invention.

The feed stream, i.e. naphtha is introduced into one end of a tower zone. Within the tower it is countercurrently contacted with a slurry of solvent and compound which is capable of forming a complex preferentially retaining at least one element of the feedstream. A variety of solvents may be utilized in the instant invention. The solvents, however, must have certain characteristics; of paramount importance is the ability to form two liquid phases at equilibrium after the complex between host and guest is formed. One liquid phase contains the feed stream depleted in guest compound; the other phase, solvent with a complex slurried therein. The solvent may also extract from the feed stream; i.e. the various components of the feed may dissolve to different degrees in the solvent. In general, aromatics dissolved in the solvent will be found in higher concentrations than in the depleted feed stream or in the original feed stream, relative to paraffins.

The solvent should also be non-reactive with respect to the host and guest compound; the complex formed by host and guest should, as indicated above, be substantially insoluble in the equilibrated system. Preferred solvents for the instant invention are liquid slightly polar solvents, such as amides, esters, nitriles, and ethers, and derivatives of these. Specifically, formamide, ethylene carbonate, acetonitrile, and their derivatives are useful.

Ether alcohols useful as solvents in this invention may be represented by the generic formula R—O—R'—OH wherein R is an alkyl or alkoxy radical having 1 to 10 carbons and R' is an alkylene radical. Typical examples of such compounds are 2-methoxy ethanol and glycols in the range of $C_2$ to $C_{10}$. Various polyols having 4 to 12 carbons may also be utilized, they are exemplified by ethylene glycol, glycerol, acetic acid esters of glycerol, e.g. monoacetin.

Other solvents which may be used include furfuryl alcohol, n-methylpyrrolidone, 1-piperazine ethanol, 2-chloroethanol and mixtures thereof.

The solutions must, of course, be liquid at the temperatures of operation of the instant invention, i.e. —50 to 180° C. It would be obvious to one skilled in the art to vary the conditions of operation and thereby liquefy a desired solvent.

Urea and thiourea are the most preferred inclusion compound-formers. Thiourea will form stable adducts with highly branched paraffin compounds starting with $C_6$ as well as cyclopentane, cyclohexane, and their derivatives, and highly substituted aromatics such as durene, 1,2,4,5-tetramethylbenzene. This invention improves the recovery of such substances by thiourea as well as making practicable the adduction of substances, not forming stable adducts, such as isopentane and 2,3-dimethylpentane.

Urea may be utilized to remove normal paraffins beginning with $C_7$ without the process of this invention. The instant invention lowers this limit of access to $C_4$.

When removing highly branched paraffins such as the dimethylbutanes from a feed stream of hexane isomers removal of dimethylbutanes by thiourea can normally be effected down to a level of about 14 wt. percent in the depleted feed stream. Similarly, when removing n-heptane with urea, a limit or about 57% in the raffinate may be normally achieved. Octane removal down to about 32% may be achieved and n-nonane may be removed down to about 17%.

To effect removal of highly branched or cycloparaffinic compounds with thiourea and normal compounds with urea down to a level of substantially 0 to 10%, preferably under 5%, a slurry promoter must be added to the process of the instant invention in order to disrupt the equilibrium. It has unexpectedly been found that tetrahydrofuran and derivatives may be used as such compounds for the thiourea system.

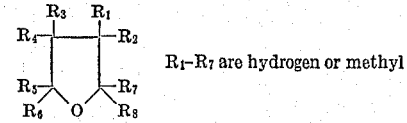

$R_1$-$R_7$ are hydrogen or methyl

The compound to be added must have the following characteristics: (1) it dissolves preferentially in solvent rather than feed mixtures, and (2) it forms a complex with the complexing agent. Thus, in the case of tetrahydrofuran and certain of its derivatives, the additive is capable of dissolving within the solvent, which would preferably be propylene or ethylene carbonate. Further, such compounds form a complex with thiourea. The presence of the complex will shift the equilibrium and result in substantially all the highly branched paraffins and naphthenes in a naphtha feedstream becoming complexed with the thiourea.

Other compounds which may be added are 2-methyltetrahydrofuran and tetrahydropyran.

The amount of slurry promoter needed is between 10% and 200% by weight of the feed stream, generally about 50-100%. The actual amount for a particular case depends on the degree of separation desired and the adduct stabilities of slurry promoter and desired guest, and must be optimized for each process.

Slurry promoters for the urea system include sebacic acid and tetraethylene glycol.

Processing conditions for the system described herein will, of course, vary widely with the particular system utilized. In general, there are no critical limitations and it is only necessary that the system be maintained as a liquid-liquid slurry system. In a urea or a thiourea system temperatures will normally range from about —50° C. to +180° C., preferred temperatures would range between —10° C. and 100° C. These extremes are dictated by the fact that below —50° C. the components tend to solidify, solutions become more viscous thereby inhibiting pumping and equilibrium solubilities are lower. Above about 180° C. thiourea melts and its adducts are generally unstable. Urea will melt at about 132° C. Pressures are not critical and the process may be conducted at subatmospheric pressures such as one-tenth of an atmosphere or on up to superatmospheric pressures such as about 50 atmospheres. Ambient pressures are normally most convenient and are preferred.

Reaction periods should be of a duration sufficient to establish equilibrium in the system. They may range from a few seconds to 30 minutes. Preferably, the reaction period, for the formation of the adduct and the separate liquid levels should be under 5 minutes; otherwise the size of a processing unit becomes unrealistically large.

The quantity of solvent employed need only be sufficient to allow the formation of pumpable 2-liquid phase system and would generally range, on a weight basis, between one-tenth to ten times the amount of host needed, depending upon the pumps and process equipment utilized. The amount of host, urea and thiourea, in relation to separable feed constituent, or guest, ranges from about 1 to 5 parts urea by weight per part separable constituent and from about 1.5 to 5 parts thiourea by weight per part separable constituent. In individual cases, one gram of cyclohexane would require about 2.7 grams of thiourea for complexing and one gram of n-dodecane requires 3.3 grams of urea for complexing. The exact amounts will vary and can readily be determined by one skilled in the art. The amount of slurry promoter to be added may also vary widely. Generally, 10 to 200 wt. percent of the feed stream, preferably 50 to 100% of the feed will suffice.

In a preferred embodiment of this invention highly branched paraffins are separated from naphtha feed stream boiling between 50 and 160° F. containing 2 to 10 wt. percent aromatics such as benzene, 30 to 70 wt. percent isoparaffins in the range of $C_5$ to $C_6$, 15 to 40 wt. percent normal paraffins in the range of $C_5$ to $C_6$, and 2 to 15 wt. percent cycloparaffins in the $C_5$ to C range. The feed stream is contacted, countercurrently, over more than one equilibrium stage, at a temperature of 20 to 40° C. and ambient pressure with a mixture of from 10 to 20 wt. percent thiourea, 50 to 85 wt. percent of a solvent which is propylene carbonate and 2 to 30 wt. percent of tetrahydrofuran. Two liquid phases result with a solid phase slurried within the bottom liquid phase. The top liquid effluent, or raffinate, is primarily depleted feed stream and contains 1 to 5% highly branched paraffins, 0.1 to 1% aromatics, and 1 to 5% cycloparaffins, the balance being normal paraffins and less extractable isoparaffins, such as 2-methylpentane. The heavier slurry stream emerging from the extraction unit contains solid adduct of thiourea and cycloparaffins, dimethylbutanes, and some isopentane. The solid is associated with solution comprising thiourea, aromatics, and a small amount of adduct forming cycloparaffins and paraffins dissolved in the propylene carbonate. Toward the end of the contacting unit from which slurry is drawn as effluent, relative to the raffinate effluent point, a recycle wash stream of aromatics, cycloparaffins, and highly branched paraffins is introduced to the contacting unit to wash the components of the raffinate and the tetrahydrofuran from the slurry.

The raffinate stream is also free of tetrahydrofuran, which remains within the staged contacting unit.

The slurry effluent is stripped of hydrocarbons, i.e. by countercurrent washing with an immiscible hydrocarbon such that the hydrocarbons extracted from the slurry may be readily separated from the wash, by flash evaporation; by the introduction of heat to promote dissolution of thiourea from solid adduct into solvent; or by a combination of these stripping methods.

The stripped slurry extract comprises aromatic, naphthenic, and highly branched paraffin hydrocarbons. Depending on the number of stages of slurry-feed contacting, the relative flow rates, and the amount and stages of washing by product done, 0 to 5% of the slurry extract product may comprise components of the raffinate.

SPECIFIC EMBODIMENTS

Example 1

In this example the effect of tetrahydrofuran on the separation of methylcyclopentane from n-heptane by thiourea slurry was studied. 50 g. of thiourea, 250 g. of propylene carbonate solvent, 100 g. of tetrahydrofuran and 100 g. of 20 wt. percent methylcyclopentane in n-heptane were equilibrated at ambient conditions, by shaking in a separatory funnel at 25° C. for 10 minutes.

The concentration of methyl cyclopentane in the feed mixture was chosen such that the equilibrium limitation should make formation of thiourea adduct difficult or impossible without the benefit of added adduct-forming guest. The limit is around 25% by weight, which is well above the feed concentration.

The raffinate was separated from the adduct slurry and all phases were analyzed.

The table below, Table I indicates the analysis of the raffinate and the adduct slurry.

TABLE I

| Substance | Grams | | | | |
|---|---|---|---|---|---|
| | Charge | Raffinate | Solution | Solid complex | Total slurry |
| Methylcyclopentane | 20 | 11.4 | 3.2 | 5.4 | 8.6 |
| n-Heptane | 80 | 64.5 | 10.7 | 4.8 | 15.5 |
| Total | 100 | 75.9 | 13.9 | 10.2 | 24.1 |

The slurry extracted 24.1% of the feed, separation factor 3.14. 27.1 g. tetrahydrofuran was found in the raffinate.

The separation factor is defined by $$\alpha = \frac{[\text{methylcyclopentane/n-heptane}] \text{ in the slurry}}{[\text{methylcyclopentane/n-heptane}] \text{ in the raffinate}}$$

Both hydrocarbons were found in the solid complex; however, it is seen that the raffinate was 15% methylcyclopentane while the extract from the total slurry was 35.7% methylcyclopentane. This illustrates a considerable enrichment over one equilibrium stage; the effect would, of course, be multiplied by using more than one stage in a continuous operation.

The above experiment was then duplicated except that no tetrahydrofuran was added to the reaction zone. The results are included below in Table II.

TABLE II

| Substance | Grams | | | | |
|---|---|---|---|---|---|
| | Charge | Raffinate | Solution | Solid complex | Total slurry |
| Methylcyclopentane | 19.7 | 17.6 | 1.9 | 0.2 | 2.1 |
| n-Heptane | 80.3 | 76.9 | 3.4 | 0 | 3.4 |
| Total | 100 | 94.5 | 5.3 | 0.2 | 5.5 |

The slurry extracted 5.5% of the feed stream for a separation factor of 2.70. Thus, in the first example 27 times as much methylcyclopentane was complexed and 1.7 times as much methylcyclopentane was found in solution. The raffinate was 18.6% methylcyclopentane; the extract was 38.2% methylcyclopentane. The results indicate that the solution capacity was increased by the addition of tetrahydrofuran.

Example 2

In this example a naphtha feed stream boiling between 50 and 160° F. and containing the following:

| | Weight percent |
|---|---|
| n-Hexane | 25 |
| Methylpentanes | 46 |
| Dimethylbutanes | 6.3 |
| Methylcyclopentane | 12.7 |
| Benzene | 10 | is treated with thiourea slurry to extract dimethylbutanes, methylcyclopentane, and benzene for motor fuel use. The feed is contacted countercurrently in a tower containing tetrahydrofuran in the amount of 100 wt. percent of the feed stream, with a slurry of propylene carbonate solvent in the amount of 83.3 wt. percent and thiourea in the amount of 16.7 wt. percent. The contacting takes place at a temperature of 25° C., ambient pressure and the ratio of the rates of the feed stream to the slurry is 1 to 4. The contacting is performed over a number of equilibrium stages from introduction of feed to the point of removal of the depleted feed, or raffinate. The raffinate contains 1.6% propylene carbonate, 33.8% normal hexane, 71.3% methylpentanes, 1% dimethylbutanes, and 1% methylcyclopentane plus benzene. Near the other end of the contacting unit, a small recycle wash stream is introduced to equilibrate the slurry with product and to wash tetrahydrofuran and raffinate components from the slurry. This wash stream is a small fraction of the extracted product to be removed from the slurry. The slurry emerging from the contacting unit is composed of 15.2% thiourea, 75.9% propylene carbonate, and 8.9% extract. The extract is 21.7% dimethylbutanes, 43.8% methylcyclopentane, and 34.5% benzene. Stripping of the extract from slurry is done by washing at 100° C. with one part by weight of a paraffinic gas oil to 5.5 parts of slurry emerging from the extractor. The extract is distilled from the gas oil wash, which is chosen to boil over a temperature range sufficiently different from the extract to allow continuous flash evaporation.

Example 3

In this example the exact conditions of Example 2 are utilized except that no tetrahydrofuran is added. The results achieved are as follows, calculated on a propylene carbonate-free basis:

| Substance | Percent | |
|---|---|---|
| | Raffinate | Extract |
| n-Hexane | 30 | |
| Methylpentanes | 55.3 | |
| Dimethylbutanes | 7.6 | |
| Methylcyclopentane | 6.0 | 43.7 |
| Benzene | 1.0 | 56.3 |

Thus, it is seen that Example 2 produces a far superior separation as indicated by non-extraction of dimethylbutanes and partial extraction of methylcyclopentane. The separation performed is the result of solvent extraction, since although both the dimethylbutanes and methylcyclopentane tend to form adduct with thiourea, the guest concentration is too low to allow adduct to be made.

Example 4

In this example the exact conditions of Example 2 are utilized except that instead of tetrahydrofuran, tetrahydropyran is utilized as the slurry promoter in the amount of 100% of the feed stream rate. The results are substantially identical to Example 2.

Example 5

In this example using the conditions of Example 1 a mixture of two heptane isomers was treated with thiourea-tetrahydrofuran-propylene carbonate slurry. Neither component normally forms stable adduct with thiourea, and the solvent selectivity would be expected to be low. 63 g. of thiourea, 313 g. of propylene carbonate, 63 g. of tetrahydrofuran, and 63 g. of 50 wt. percent, 2,3-dimethylpentane-normal heptane were equilibrated. Analysis of all phases yielded the following results:

TABLE III

| Substance | Grams | | | |
|---|---|---|---|---|
| | | | Slurry detail | |
| | Top layer | Slurry | Solution | Solid complex |
| Thiourea | | 63 | 16.2 | 46.8 |
| Propylene carbonate | 0.5 | 312.5 | 312.5 | 0 |
| Tetrahydrofuran | 6.55 | 56.45 | 39.37 | 17.1 |
| 2,3-dimethylpentane | 18.47 | 13.03 | 5.11 | 7.92 |
| n-Heptane | 24.29 | 7.21 | 5.55 | 1.66 |
| Total | 49.8 | 45.22 | 378.7 | 73.5 |

Considerable enrichment of 2,3-dimethylpentane in the slurry was found, due entirely to selective retention in the solid complex. The tendency of tetrahydrofuran to remain either in solution, in the slurry or as solid complex was also evident.

Example 6

The fact that use of tetrahydrofuran with a thiourea slurry depends on a judicious choice of solvent is illustrated by this example. 50 g. of thiourea, 250 g. of sulfolane, 100 g. of tetrahydrofuran, and 100 g. of 50 wt. percent 2,3-dimethylpentane-normal heptane were equilibrated as in Example 5.

TABLE IV

| Substance | Grams | | | |
|---|---|---|---|---|
| | | | Slurry detail | |
| | Top layer | Slurry | Solution | Solid complex |
| Thiourea | | 50 | 35.6 | 14.4 |
| Sulfolane | 3.6 | 246.4 | 246.4 | 0 |
| Tetrahydrofuran | 42.8 | 57.2 | 51.9 | 5.3 |
| 2,3-dimethylpentane | 46.3 | 3.7 | 2.0 | 1.7 |
| n-Heptane | 46.3 | 3.7 | 1.9 | 1.8 |
| Total | 139.0 | 361.0 | 337.8 | 23.2 |

In contrast to Example 5, no separation of 2,3-dimethylpentane from normal heptane could be discerned.

What is claimed is:

1. In a process for the selective separation of at least one separable hydrocarbon constituent contained in a liquid hydrocarbon feedstream mixture which comprises contacting said feedstream in a contacting zone with a substance which is capable of forming an insoluble inclusion compound with a separable constituent of said feedstream and which is selected from the group consisting of urea or thiourea, said substance being in an anhydrous, inert solvent which is substantially immiscible with said feedstream and wherein an equilibrium is established between said insoluble inclusion compound, said substance and said separable feedstream constituent, the improvement which comprises adding to said contacting zone a nonhydrocarbon slurry promoter which dissolves preferentially in said solvent containing said substance rather than in components of said feedstream and forms an insoluble inclusion compound with said substance whereby the said equilibrium is shifted so that additional insoluble inclusion compound with said separable constituent is formed.

2. In a process for the selective separation of at least one separable constituent of a light naphtha feedstream which comprises countercurrently contacting said feedstream, in the liquid phase, in a contacting zone with a substance which is capable of forming an insoluble inclusion compound with at least one separable constituent of said feedstream and which is selected from the group consisting of urea or thiourea, said substance being in an anhydrous, inert solvent which is substantially immiscible with said feedstream and wherein an equilibrium is established between said insoluble inclusion compound, said substance and said separable constituent, the improvement which comprises adding to said contacting zone a nonhydrocarbon slurry promoter which dissolves preferentially in said solvent containing said substance rather than in components of said feedstream and forms an insoluble inclusion compound with said substance whereby the said equilibrium is shifted so that additional insoluble inclusion compound with said separable constituent is formed.

3. The process of claim 1 wherein the slurry promoter is tetrahydrofuran and derivatives thereof.

4. The process of claim 1 wherein said solvent is propylene carbonate.

5. The process of claim 1 wherein said slurry promoter is tetrahydrofuran.

6. The process of claim 1 wherein said slurry promoter is tetrahydropyran and derivatives thereof.

7. The process of claim 1 wherein said solvent is formamide or derivatives thereof.

8. The process of claim 1 wherein said solvent is ethylene carbonate or derivatives thereof.

9. The process of claim 1 wherein said solvent is an ether alcohol.

10. The process of claim 1 wherein said solvent is 2-methoxyethanol.

11. The process of claim 1 wherein said substance is contacted with said feedstream in the form of a slurry in said solvent.

12. The process of claim 2 wherein said substance is thiourea and said separable constituent is a branched-chain paraffin.

13. The process of claim 2 wherein said solvent is propylene carbonate.

14. The process of claim 2 wherein said slurry promoter is selected from tetrahydropyran and derivatives thereof.

15. The process of claim 2 wherein said slurry promoter is selected from tetrahydrofuran and derivatives thereof.

16. The process of claim 12 wherein said solvent is 2-methoxy ethanol.

17. The process of claim 2 wherein said substance is contacted with said feedstream in the form of a slurry in said solvent.

References Cited

UNITED STATES PATENTS

| | | | |
|---|---|---|---|
| 3,534,116 | 10/1970 | Fuller | 208—25 |
| 2,666,048 | 1/1954 | Fitzwilliam et al. | 260—96.5 R |
| 2,673,195 | 3/1954 | Busso et al. | 260—96.5 R |
| 2,872,409 | 2/1959 | Franz et al. | 260—96.5 R |
| 2,637,681 | 5/1953 | Arnold et al. | 260—96.5 R |
| 2,763,637 | 9/1956 | McKay et al. | 260—96.5 R |
| 3,537,983 | 11/1970 | Fuller et al. | 208—308 |

FOREIGN PATENTS

| | | | |
|---|---|---|---|
| 718,703 | 11/1954 | Great Britain | 208—308 |
| 686,701 | 1/1953 | Great Britain | 208—308 |

HERBERT LEVINE, Primary Examiner

U.S. Cl. X.R.

260—96.5